United States Patent [19]

Kader

[11] 3,960,474

[45] June 1, 1976

[54] APPARATUS FOR MANUFACTURING REINFORCED PLASTIC CONTAINERS BY BLOW MOLDING

[75] Inventor: Reiner Kader, St. Augustin, Germany

[73] Assignee: Mauser Kommanditgesellschaft, Cologne, Germany

[22] Filed: May 20, 1974

[21] Appl. No.: 471,642

[30] Foreign Application Priority Data

May 24, 1973 Germany.............................. 2326477

[52] U.S. Cl.......................... 425/503; 425/DIG. 214
[51] Int. Cl.$^2$...................... B29D 3/02; B29C 17/07
[58] Field of Search.. 425/503, DIG. 214, DIG. 206, 425/DIG. 233

[56] References Cited
UNITED STATES PATENTS

| | | | |
|---|---|---|---|
| 3,097,058 | 7/1963 | Branscum et al. | 425/DIG. 206 |
| 3,275,726 | 9/1966 | Rudolph | 425/503 X |
| 3,479,421 | 11/1969 | Armbruster et al. | 425/DIG. 212 |
| 3,575,949 | 4/1971 | Humphrey | 425/DIG. 214 |
| 3,861,851 | 1/1975 | Schiemann | 425/503 |

*Primary Examiner*—Ronald J. Shore
*Assistant Examiner*—David S. Safran

[57] ABSTRACT

A cylindrical, synthetic plastic container having reinforcing hoops permanently bonded around the ends of the container is manufactured in a single blow molding process. Half of the outer peripheral edge portion of each of two reinforcing hoops is positioned in a semi-cylindrical mold half to place the hoops in spaced, parallel, co-axial alignment. Thereafter, a tube of soft thermoplastic is extruded through the open central portions of the hoops until the end of the tube overlies a co-axially positioned pneumatic nozzle. The semi-cylindrical mold half with the hoops retained therein is moved into engagement with a mating, semi-cylindrical mold half to form a cylindrical mold. End plates are moved into engagement with the hoops from opposite ends of the cylindrical mold; and air under pressure is admitted through the nozzle to blow the walls of the tube of soft thermoplastic against the interior walls of the mold, the end plates and exposed circumferential portions of the reinforcing hoops to form a homogeneous bond with the hoops.

6 Claims, 4 Drawing Figures

APPARATUS FOR MANUFACTURING REINFORCED PLASTIC CONTAINERS BY BLOW MOLDING

The present invention relates generally to a process, apparatus and the resulting product, all in the art of blow molding. More specifically, the product of the present invention is a thermoplastic container having reinforcing rings or hoops homogeneously bonded thereto around the peripheries of its opposite ends. The process of the present invention for making the reinforced container of the present invention comprises (1) placing the reinforcing hoops in spaced co-axial alignment in the molding apparatus of the present invention, (2) extruding a tube of soft thermoplastic material in the co-axial passage formed by the hoops, and thereafter (3) blowing the walls of the soft thermoplastic tube against the walls of the mold and surfaces of the hoops to form a substantially homogeneous bond between the thermoplastic and the reinforcing hoops.

In the blow molding art, techniques are known for blow molding containers having relatively small prefabricated parts, such as handles and closures, bonded thereto. However, no satisfactory techniques are known for efficiently and effectively blow molding containers having prefabricated reinforcing hoops, or other relatively large circumferential elements, bonded thereto.

Prior techniques for blow molding containers with reinforcing hoops (or other relatively large circumferential elements) bonded thereto required the provision of relatively complex fittings for retaining the reinforcing hoops in place prior to the blow molding operation.

It is known in the blow molding art to reinforce the periphery of the relatively large opening in a synthetic plastic, blow-molded, open end drum by the following process: (1) placing a reinforcing ring or hoop in a suitable fitting so that the hoop lies beneath an extrusion head; (2) extruding a tube of soft thermoplastic material through the open central portion of the hoop; (3) closing two semi-cylindrical halves of a cylindrical mold to engage the hoop; and thereafter (4) blowing the thermoplastic tube into engagement with the walls of the mold and a circumferential portion of the hoop.

Techniques are also known in the blow molding art for blow molding an open end container having no reinforcing hoop around the opening, but having a reinforcing hoop around the bottom end of the container. Such techniques typically comprise the following process: (1) placing the reinforcing ring in a fitting which is spaced a considerable distance below an extrusion head which is adapted to extrude a tube of soft thermoplastic material; (2) extruding a tube of soft thermoplastic material; (3) closing the end of the descending tube of soft thermoplastic material with a special purpose tool and removing the scrap material resulting therefrom (i.e., the excess material squeezed out of the tool during the step of closing the end of the tube); (4) moving two semi-cylindrical mold halves together to form a cylindrical mold around the soft thermoplastic tube; (5) raising the fitting which holds the reinforcing hoop upwardly into engagement with the closed bottom of the tube; and thereafter (6) blowing the thermoplastic tube against the walls of the mold and the reinforcing ring and fitting therefor to form the container with the reinforcing hoop bonded to the bottom of the container.

Prior to the advent of the present invention, no feasible technique has been known for blow molding synthetic plastic containers having closed ends (e.g., a bung type container having end walls which are integral with the circumferential side wall of the container and provided with a bung type opening in one of the end walls) with reinforcing rings bonded around the peripheries of the top and bottom ends of the containers.

It is, of course, desirable to provide such synthetic plastic containers with reinforcing rings at the opposite ends thereof to prevent or reduce the likelihood of deforming or otherwise damaging or breaking the container when it is rolled, lifted, transported, loaded on a truck, unloaded or otherwise handled.

In view of the fact that no practical techniques (including the techniques described above in connection with placing upper reinforcing rings or lower reinforcing rings on a container during a blow molding process) have been known for bonding reinforcing rings to the upper and lower ends of a synthetic plastic container during the blow molding of the container, the manufacturers of synthetic plastic containers have had to resort to reinforcing the outer ends of the containers with metal rings after the container has been blow molded. This technique of mounting upper and lower metal reinforcing rings around the upper and lower ends of a thermoplastic container after the container has been blow molded has several disadvantages. First of all, the process of mounting metal rings after the container has been blow molded is a relatively expensive, extra step. Secondly, metal reinforcing rings on plastic containers are prone to become deformed when the containers are handled (e.g., rolled along the ground, loaded on trucks, unloaded, etc.). Still further, because of the different coefficients of expansion and contraction of synthetic plastic and metal, the metal reinforcing rings are prone to separate from the container ends when the containers are subjected to relatively cold and/or hot temperatures.

In view of the foregoing, it is an object of the present invention to provide an effective and efficient apparatus and process for bonding reinforcing rings or hoops to the ends of blow molded thermoplastic containers during the blow molding process.

The foregoing and other objects and advantages have been attained by the apparatus and process of the present invention. According to the present invention, reinforcing hoops or rings (preferably of a hard plastic material) are inserted into spaced, semi-circular upper and lower grooves in a semi-cylindrical mold half. When so placed, the two spaced reinforcing rings are substantially parallel to one another and co-axially aligned. Thereafter, the mold half carrying the reinforcing hoops is moved to an intermediate position wherein the open central passage through the two reinforcing hoops underlies an extruder head. An extruder is then operated to extrude a tube of soft thermoplastic material (sometimes referred to as "parison") from the extruder head, through the open central passage of the reinforcing hoops, and over a pneumatic nozzle. Thereafter, the semi-cylindrical mold half which carries the reinforcing hoops is brought into engagement with a mating mold half to form a cylindrical mold. End plates are then brought into engagement with the outer ends of the reinforcing hoops and air under pressure is blown through the pneumatic nozzle and into the soft thermoplastic tube to blow the soft thermoplastic against the interior walls of the mold and the end plate, and also into engagement with a continuous circumferential portion of each of the upper and lower reinforcing hoops.

The plastic is then cooled or allowed to cool and harden, and the resulting product removed from the mold is a thermoplastic container having the reinforcing rings homogeneously bonded around the upper and lower ends of the container.

Other objects and attendant advantages of the present invention will become apparent from the following description and drawings of the preferred embodiments of the invention.

Figure 1:
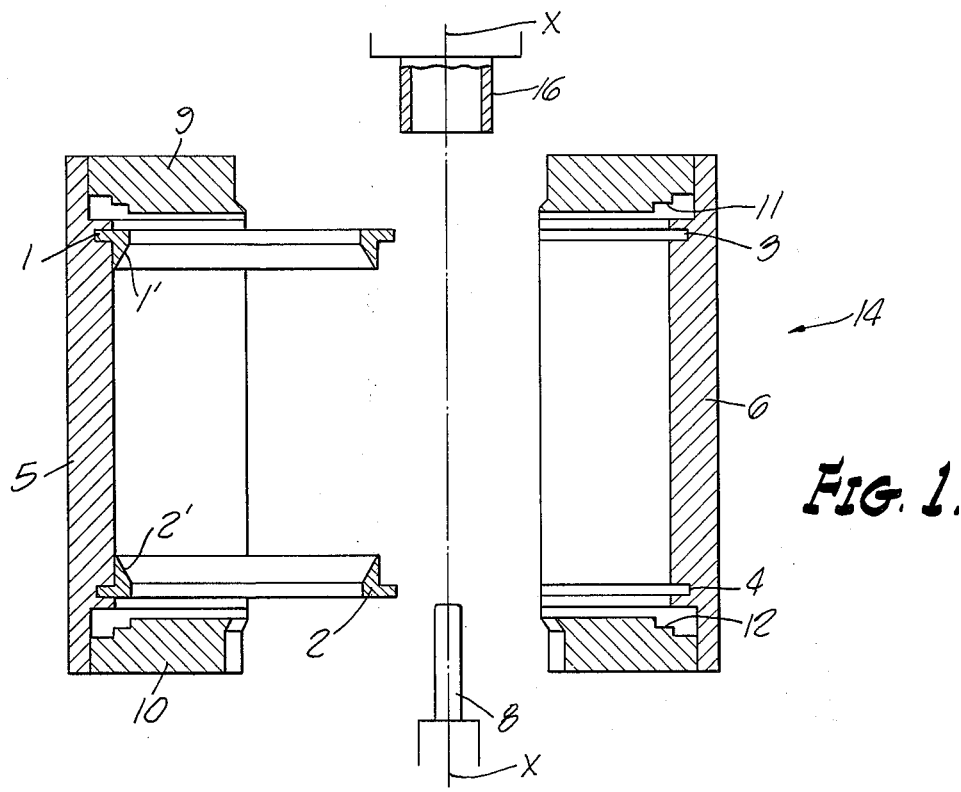
FIG. 1 is a sectional elevation view of the molding apparatus of the present invention showing the mold in a fully extended position with reinforcing hoops inserted in grooves in one of the mold halves.

Referring now to the drawings, the mold apparatus 14 of the present invention comprises a generally cylindrical mold divided into generally semi-cylindrical left and right halves 5 and 6, respectively. The mold apparatus 14 further includes upper and lower plates or covers 9 and 10, respectively. Each of the plates 9 and 10 is generally circular and is divided into generally semi-circular left and right halves.

Figure 3:
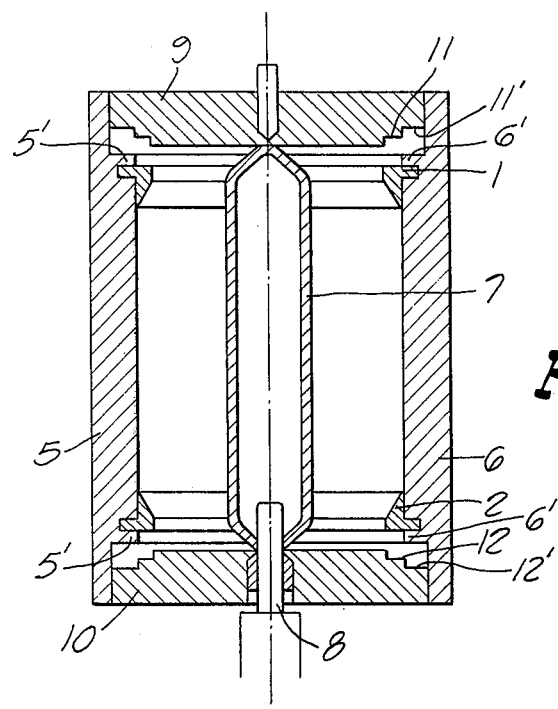
FIG. 3 is a sectional elevation view similar to FIGS. 1 and 2, showing the mold halves in their closed position, prior to air being blown into the soft thermoplastic tube.
Figure 4:
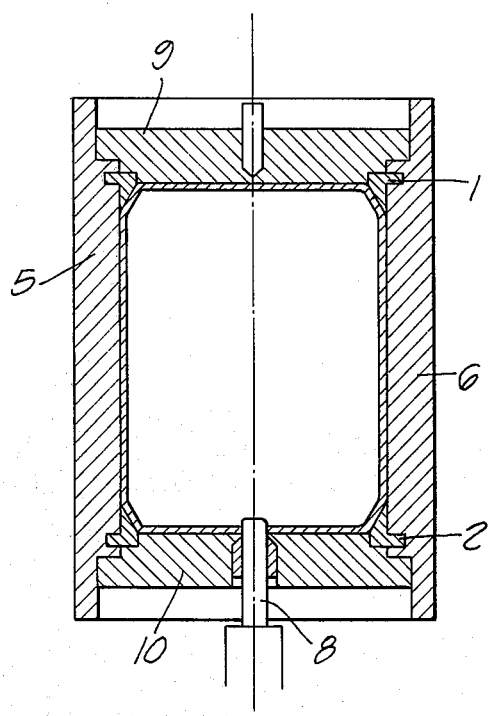
FIG. 4 is a sectional elevation view similar to FIGS. 1–3 showing the apparatus of the present invention after the thermoplastic tube has been blown against the interior surfaces of the mold and the reinforcing hoops to form the container of the present invention.

Each of the semi-cylindrical mold halves 5 and 6 has an upper semi-circular groove 3 near the upper end thereof, and a lower semi-circular groove 4 near the lower end. As described in greater detail below, when the two semi-cylindrical mold halves 5 and 6 are moved into engagement with one another (e.g., as shown in FIGS. 3 and 4), the two upper semi-circular grooves 3,3 align with one another to form an annular upper groove, and the two lower semi-circular grooves 4, 4 align with one another to form an annular lower groove. These annular grooves receive and retain outwardly extending peripheral flanges of reinforcing rings or hoops 1 and 2 which are bonded to the outer peripheries of the upper and lower ends of a blow molded container during the blow molding process.

Figure 2:
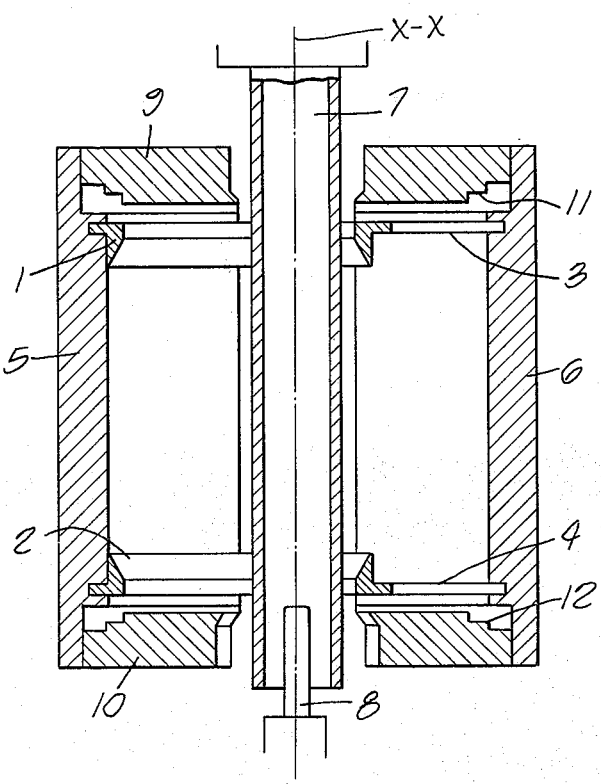
FIG. 2 is a sectional elevation view similar to FIG. 1, showing the mold halves in their intermediate position with a tube of soft thermoplastic material extending downwardly through the reinforcing hoops and over a pneumatic nozzle.

The apparatus 14 of the present invention is used in conjunction with an extruder, the outlet head 16 of which is shown in the drawings, and a pneumatic apparatus, the outlet nozzle 8 of which is shown in the drawings. As described more fully below, the extruder head 16 emits a tube 7 of relatively soft thermoplastic material (sometimes referred to as "parison"). As best shown in FIGS. 2 and 3, the pneumatic nozzle 8 is aligned with the extruder head 16, along a vertical axis X—X, so that it will receive the lower end of the soft thermoplastic tube 7 emitted from the extruder head 16.

As shown by a comparison of FIGS. 1, 2 and 3 of the drawings, and as described in greater detail below in connection with the improved process of the present invention, the semi-cylindrical mold halves 5 and 6 are movable toward one another in a horizontal direction (i.e., perpendicular to the axis X—X). FIG. 1 shows the mold halves 5 and 6 in their fully separated position which permits the reinforcing rings or hoops 1 and 2 to be inserted into the semi-circular upper and lower grooves 3 and 4, respectively. FIG. 2 shows the mold halves 5 and 6 in an intermediate position which permits the extruder head 16 to extrude or drop a tube 7 of parison through the open central portion of each of the reinforcing hoops 1 and 2. FIGS. 3 and 4 show the mold halves 5 and 6 in their closed position wherein the two semi-circular grooves 3 and the two semi-circular grooves 4 connect with one another to form annular upper and lower grooves which receive and retain the reinforcing hoops 1 and 2.

As best shown by comparing FIGS. 3 and 4, the upper and lower plates 9 and 10 of the mold apparatus 14 are adapted to be moved vertically toward one another.

The improved process of making an improved, reinforced plastic container according to the present invention will now be described.

As shown in FIG. 1, the upper and lower reinforcing rings or hoops 1 and 2, respectively, are first placed in the upper and lower semi-circular grooves 3 and 4, respectively, in the left mold half 5. When so positioned the reinforcing hoops 1 and 2 are in substantial alignment with one another so as to form an open passage for the soft thermoplastic tube or parison 7. Thereafter, both halves of the top and bottom plates 9 and 10 are placed in position, as shown in FIG. 1.

The mold halves 5 and 6 (with the reinforcing hoops 1 and 2 retained in the semi-circular grooves 3 and 4 in the left mold half 5) are driven toward one another to the intermediate position shown in FIG. 2. In this intermediate position the open passage through the central portions of the reinforcing rings 1 and 2 are aligned with the extruder head 16 and the pneumatic nozzle 8.

With the mold halves 5 and 6 and the reinforcing hoops 1 and 2 in the position shown in FIG. 2, the extruder (not shown) is operated to extrude a soft thermoplastic tube 7 downwardly through the open hoops 1 and 2 until the lower portion of the tube 7 overlies the pneumatic nozzle 8. Thereafter the mold halves 5 and 6 are moved to their closed position shown in FIG. 3, whereby the halves of top plate 9 will pinch or press the upper portion of tube 7 closed, and the halves of lower plate 10 will press the lower portion of tube 7 against the nozzle 8. As shown in FIG. 3, the center line of tube 7 substantially coincides with the vertical axis X—X and forms a closed, empty body.

As the mold halves 5 and 6 move to their closed (FIG. 3) position, the previously free halves of the reinforcing hoops 1 and 2 (i.e., the right halves of the hoops, as shown in the drawings) move into the semi-circular upper and lower grooves 3 and 4, respectively, in the right mold half 6 and are retained thereby.

With the mold halves 5 and 6 closed, as shown in FIG. 3, the top and bottom plates 9 and 10, respectively, are moved toward one another (i.e., in a direction along the axis X—X) to the position of these plates shown in FIG. 9. It will be noted that the inner surface of each of the plates 9 and 10 (i.e., the surface facing the interior of the mold) are stepped to provide inner and outer circumferential grooves 11, 11' and 12, 12', respectively. The inner circumferential groove 11 in the top plate 9 receives the inner portion of the reinforcing ring 1; and the inner circumferential groove 12 in the lower plate 10 receives the inner portion of the reinforcing ring 2. The outer, deeper circumferential grooves 11', 12' in the top and bottom plates 11 and 12, respectively, receive the semi-circular corners 5', 5' and 6', 6' near the upper and lower ends of the mold halves 5 and 6.

With the mold halves 5 and 6, and the end plates 9 and 10 in position, as shown in FIG. 4, it will be appreciated that the reinforcing rings or hoops 1 and 2 are locked in place.

The pneumatic apparatus (not shown) is then turned on to expel air under pressure from the nozzle 8 into the interior of the soft thermoplastic tube 7 to blow the tube walls outwardly against the interior walls of the mold halves 5 and 6, the beveled surfaces 1' and 2' of reinforcing hoops 1 and 2, and the inner surfaces of the end plates 9 and 10.

Thereafter, the thermoplastic material is allowed to cool and harden, the end plates 9 and 10 and the mold halves 5 and 6 are moved outwardly, the nozzle 8 is removed, and the finished, hardened, reinforced container is removed from the mold apparatus 14.

The resulting, reinforced container (shown in the mold apparatus 14 in FIG. 4) has the reinforcing rings or hoops 1 and 2 bonded to the upper and lower peripheral ends of the plastic container along the beveled inner edge surfaces 1' and 2' of the hoops.

The reinforcing hoops may be made of any suitable, relatively hard material, preferably synthetic plastic, which will readily bond to the plastic body of the container.

While the improved molding process, molding apparatus and molded product of the present invention have been described above and shown in the drawings with reference to the preferred embodiments thereof, it is contemplated, of course, that numerous changes and modifications may be made to the process, apparatus and product of the preferred embodiments of the invention without departing from the spirit and scope thereof. Accordingly, it is intended that the scope of this patent be limited only by the scope of the appended claims.

I claim:

1. In a molding apparatus for blow molding thermoplastic containers having their opposite ends reinforced by reinforcing hoops bonded to the outer peripheral end edges thereof, the improvement comprising:
   a mold divided into two halves which are movable between an extended position wherein said mold halves are spaced from one another and a closed position wherein said mold halves engage one another to form a continuous, circumferential, interior surface;
   each of said mold halves having an upper end and a lower end;
   each of said mold halves having an upper groove in its interior surface adjacent to said upper end thereof and a lower groove in its interior surface adjacent to said lower end thereof;
   said upper grooves in each of said mold halves being aligned with one another so as to form a continuous upper groove when said mold halves are in their closed position;
   said lower grooves in said mold halves being aligned with one another so as to form a continuous lower groove when said mold halves are in their closed position;
   said continuous upper and lower grooves being adapted to receive and retain the outer peripheral edges of reinforcing hoops;
   an upper end plate half overlying said upper end of each of said mold halves; and a lower end plate half underlying said lower end of each of said mold halves;
   said end plate halves being movable with said mold halves between their said extended position and their said closed position;
   said end plates being movable toward one another when said mold halves are in their said closed position to engage and retain portions of upper and lower reinforcing hoops in place.

2. An apparatus according to claim 1, wherein said mold halves when in said extended position, are spaced sufficiently apart to permit the insertion of approximately one-half of a reinforcing hoop in each of said upper and lower grooves in one of said mold halves whereby said reinforcing hoops will be spaced from one another and co-axially aligned to provide a through passage through the open central portions of said hoops; and wherein said mold halves are movable to an intermediate position wherein the through space in said upper and lower reinforcing hoops will underlie an extruder head and overlie the nozzle of a fluid emitting device.

3. A molding apparatus according to claim 1, wherein said lower end plate halves are provided with cutaway portions adapted to engage and enclose the end of a fluid-emitting nozzle when said mold halves are moved to their said closed position.

4. A molding apparatus according to claim 1, wherein each of said mold halves are semi-cylindrical, each of said upper and lower grooves in the interior surface of each of said mold halves are semi-circular, and each of said halves of said top and bottom plates are generally semi-circular.

5. An improved apparatus for blow molding a thermoplastic container having its opposite ends reinforced by reinforcing hoops, comprising:
   a pair of mold halves having inner surfaces facing one another;
   each of said mold halves having an upper end and a lower end;
   each of said mold halves having an upper groove cut in its said inner surface adjacent to its said upper end and spaced for receiving an outwardly extending peripheral edge of an upper reinforcing hoop, and a lower groove cut in its said inner surface adjacent its said lower end thereof for receiving an outwardly extending peripheral edge portion of a lower reinforcing hoop;
   said mold halves being movable between an extended position wherein about half of an upper and lower reinforcing hoop may be inserted into said upper and lower grooves in one of said mold halves, an intermediate position wherein the open central portion of upper and lower reinforcing hoops retained in said upper and lower grooves in one of said mold halves will underlie an extruder head and overlie a nozzle adapted to emit fluid under pressure, and a closed position wherein said mold halves engage one another to form a continuous interior mold surface and each of said upper grooves and each of said lower grooves engage one another to form continuous upper and lower grooves which retain upper and lower reinforcing hoops;

an upper end plate half overlying said upper end of each of said mold halves; and a lower end plate half overlying said lower end of each of said mold halves;

said end plate halves being movable with said mold halves between their said extended position, their said intermediate position and their said closed position;

said end plates being movable toward one another when said mold halves are in their said closed position to engage and retain portions of upper and lower reinforcing hoops in place.

6. An improved apparatus for blow molding a cylindrical thermoplastic container having integral upper and lower ends reinforced at their peripheral edges by annular, plastic reinforcing hoops, comprising:

a pair of generally semi-cylindrical mold halves having generally semi-cylindrical inner surfaces facing one another;

each of said semi-cylindrical mold halves having an upper end portion and a lower end portion;

each of said upper and lower end portions of each of said mold halves being stepped to provide a recess therein;

each of said semi-cylindrical mold halves having an upper semi-circular groove cut therein adjacent to its said stepped upper end portion and spaced downwardly therefrom for receiving an outwardly extending peripheral edge portion of a cylindrical upper reinforcing hoop, and a lower semi-circular groove cut therein adjacent its said stepped lower end portion thereof and spaced upwardly therefrom for receiving an outwardly extending peripheral edge portion of a cylindrical lower reinforcing hoop;

a pair of mating, generally semi-circular upper end plates adapted to fit within said recesses formed in said stepped upper portions of said mold halves;

a pair of mating, generally semi-circular lower end plates adapted to fit within said recesses formed in said stepped lower portions of said mold halves;

each of said generally semi-circular end plates including inner surfaces facing one another;

each of said inwardly facing surfaces of said end plates being stepped to provide an inner semi-circumferential groove and a deeper, outer circumferential groove;

said inner circumferential groove on the inwardly facing surface of each of said semi-circular end plates being adapted to engage about one half of the outer end surface of a reinforcing hoop;

each of said deeper, outer semi-circumferential grooves in each of said semi-circular end plates being adapted to engage the stepped surface portion at the upper or lower portion of its respective mold half;

said semi-circular mold halves being movable between an extended position wherein upper and lower reinforcing hoops may be inserted into said upper and lower semi-circular grooves, an intermediate position wherein open central portions of upper and lower reinforcing hoops are substantially co-axially aligned with one another and underlie an extruder head and overlie a nozzle which is adapted to admit air under pressure and a closed position wherein said semi-cylindrical mold halves engage one another to form a cylindrical mold and said upper and lower semi-circular grooves engage one another to form annular upper and lower grooves which retain the outer peripheral edges of annular reinforcing hoops;

each of said semi-circular end plates being movable with said semi-cylindrical mold halves between said extended position, said intermediate position and said closed position; each of said upper semi-circular end plates and each of said lower semi-circular end plates mating with one another to form generally circular upper and lower end plates when said mold halves are in their said closed position; said semi-circular inner and outer grooves forming annular inner and outer grooves when said mold halves are in their said closed position;

said upper and lower end plates being movable toward and away from one another when said mold halves are in their said closed position.

* * * * *